US011964236B2

United States Patent
Noekleby et al.

(10) Patent No.: US 11,964,236 B2
(45) Date of Patent: Apr. 23, 2024

(54) FILTER DEVICE, AND METHOD OF ASSEMBLY

(71) Applicant: AKER CARBON CAPTURE NORWAY AS, Lysaker (NO)

(72) Inventors: Pal Helge Noekleby, Sandefjord (NO); Michael Hilditch, Nesbyen (NO)

(73) Assignee: AKER CARBON CAPTURE NORWAY AS, Lysaker (NO)

( * ) Notice: Subject to any disclaimer, the term of this patent is extended or adjusted under 35 U.S.C. 154(b) by 525 days.

(21) Appl. No.: 17/298,029

(22) PCT Filed: Nov. 29, 2019

(86) PCT No.: PCT/NO2019/050263
§ 371 (c)(1),
(2) Date: May 28, 2021

(87) PCT Pub. No.: WO2020/111949
PCT Pub. Date: Jun. 4, 2020

(65) Prior Publication Data
US 2022/0097005 A1  Mar. 31, 2022

(30) Foreign Application Priority Data

Nov. 30, 2018 (NO) .................................. 20181546

(51) Int. Cl.
*B01D 63/06* (2006.01)
*B01D 63/04* (2006.01)
*E21B 43/36* (2006.01)

(52) U.S. Cl.
CPC ......... *B01D 63/069* (2022.08); *B01D 63/046* (2013.01); *E21B 43/36* (2013.01);
(Continued)

(58) Field of Classification Search
None
See application file for complete search history.

(56) References Cited

U.S. PATENT DOCUMENTS

| 6,017,451 A | 1/2000 | Kopf |
| 2002/0148767 A1 | 10/2002 | Johnson et al. |

(Continued)

FOREIGN PATENT DOCUMENTS

| CN | 104226120 A | 12/2014 |
| JP | 2004-136173 A | 5/2004 |

(Continued)

OTHER PUBLICATIONS

International Standard ISO 27509: "Petroleum and natural gas industries—Compact flanged connections with IX seal ring", pp. 1-100, First edition (2012).

*Primary Examiner* — Chester T Barry
(74) *Attorney, Agent, or Firm* — Norman B. Thot

(57) ABSTRACT

A filter device includes an inlet manifold, an outlet manifold and membrane filter units. Each membrane filter unit has an inlet opening for a fluid flow to be processed, a first outlet opening for a retentate portion of the fluid flow, and a second outlet opening for a remaining portion of the fluid flow. Each inlet opening is fluidly connected to the inlet manifold, and each first outlet opening is fluidly connected to the outlet manifold. The two membrane filter units are staggered and are not axially aligned with respect to each other. One of the membrane filter units is fluidly connected to the inlet manifold and to the outlet manifold via a first set of conduits, and the other membrane filter unit is fluidly connected to the inlet manifold and to the outlet manifold via a second set of conduits.

16 Claims, 15 Drawing Sheets

(52) U.S. Cl.
CPC .. *B01D 2313/105* (2013.01); *B01D 2313/125* (2013.01); *B01D 2313/131* (2022.08); *B01D 2313/2011* (2022.08); *B01D 2315/10* (2013.01); *B01D 2317/04* (2013.01); *B01D 2319/04* (2013.01)

(56) References Cited

U.S. PATENT DOCUMENTS

| | | | |
|---|---|---|---|
| 2009/0020008 A1* | 1/2009 | Wynn | B01D 63/046 |
| | | | 95/45 |
| 2013/0168307 A1* | 7/2013 | Drivarbekk | B01D 61/18 |
| | | | 210/321.78 |
| 2016/0152932 A1* | 6/2016 | Herb | B01D 63/046 |
| | | | 210/321.89 |
| 2018/0002623 A1 | 1/2018 | Noekleby et al. | |
| 2020/0094192 A1 | 3/2020 | Strikovski et al. | |

FOREIGN PATENT DOCUMENTS

| | | |
|---|---|---|
| WO | WO 00/62908 A1 | 10/2000 |
| WO | WO 2012/004304 A2 | 1/2012 |
| WO | WO 2016/108697 A1 | 7/2016 |
| WO | WO 2018/236380 A1 | 12/2018 |

\* cited by examiner

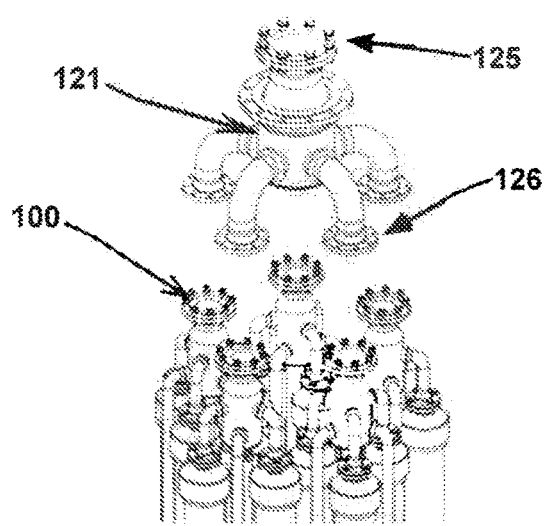
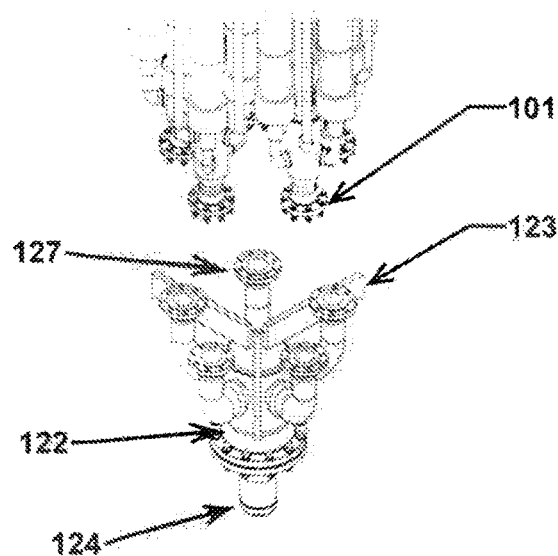
Fig. 13  Fig. 14
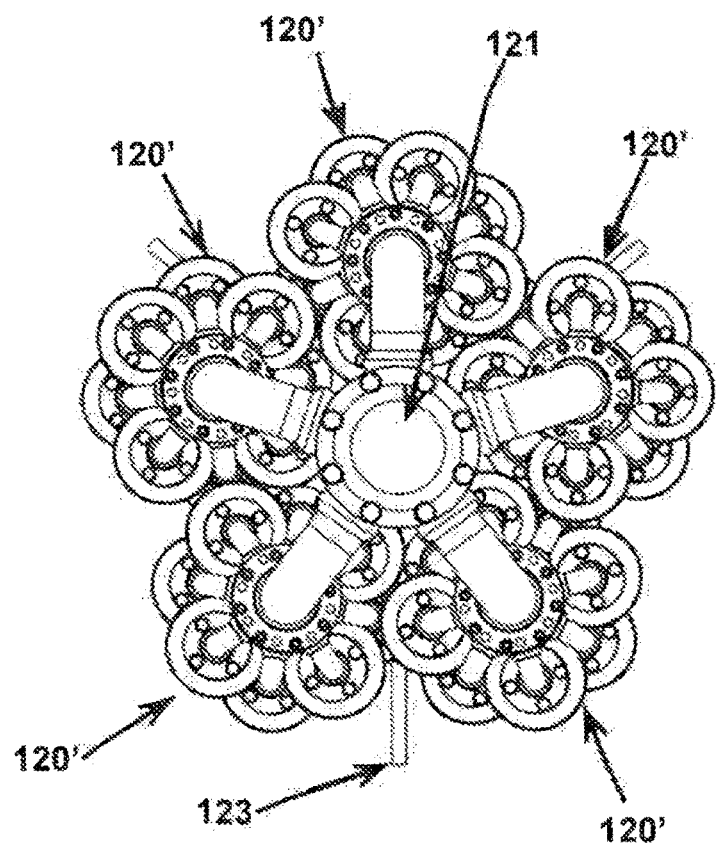
Fig. 15

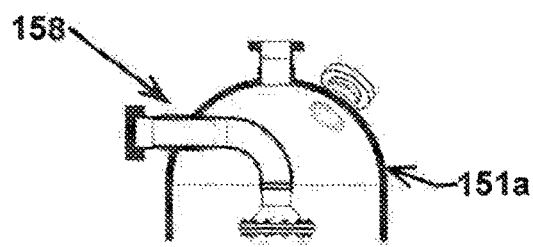
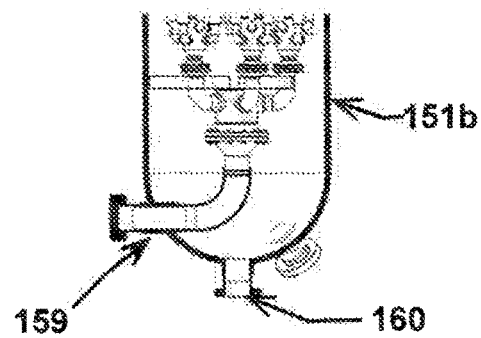
Fig. 19    Fig. 20
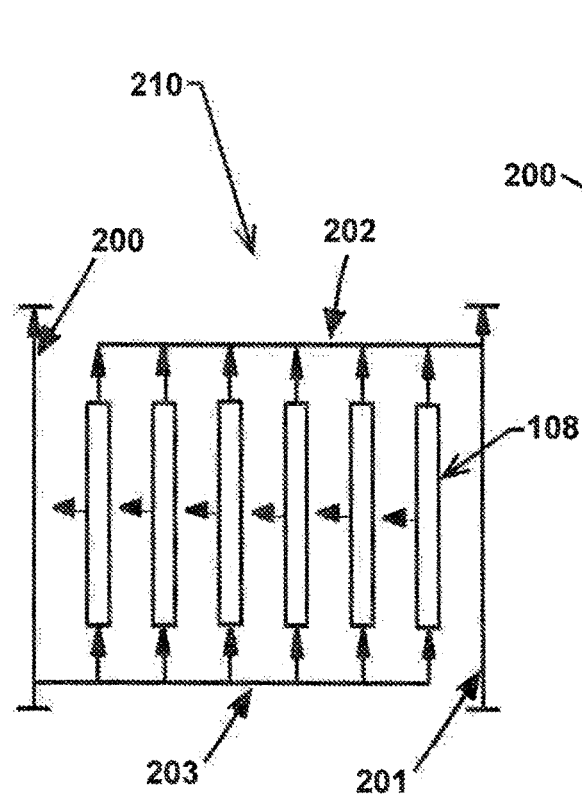
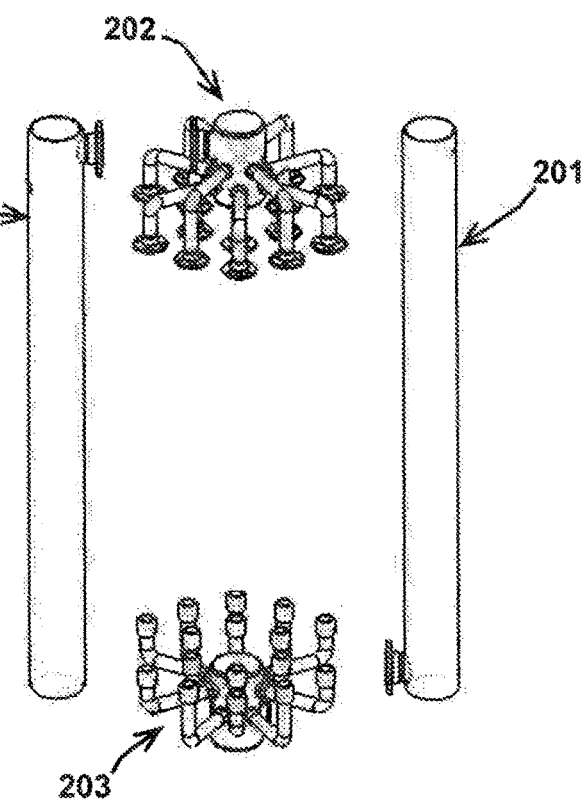
Fig. 21    Fig. 22

FILTER DEVICE, AND METHOD OF ASSEMBLY

CROSS REFERENCE TO PRIOR APPLICATIONS

This application is a U.S. National Phase application under 35 U.S.C. § 371 of International Application No. PCT/NO2019/050263, filed on Nov. 29, 2019 and which claims benefit to Norwegian Patent Application No. 20181546, filed on Nov. 30, 2018. The International Application was published in English on Jun. 4, 2020 as WO 2020/111949 A1 under PCT Article 21(2).

FIELD

The present invention relates to the field of fluid processing, and more precisely to the filtration of fluids using a plurality of membrane filters. The present invention more specifically relates to a filter device, a membrane filter unit, and an associated method of installation.

BACKGROUND

A membrane filter comprises one or more membranes (thin sheets or films) having specific pore sizes. When a fluid (e.g., a gas or a liquid) is forced against the membrane, particles larger than the pore size are retained, while the remaining fluid particles are allowed to permeate through the membrane pores. The retained particles may, for example, be microbiological particles, molecules, or ions, depending on the pore size. Examples of membrane filter types, defined by their pore size, are microfilters, ultrafilters, and nanofilters.

Membrane filters are used in various technical fields (e.g., water purification and gas purification) and industries (e.g., public utility services, oil and gas exploration). For example, one type of membrane filter is used for removing water from hydrocarbon wellstreams, while another membrane filter type is used for removing unwanted constituents from a natural gas. Membrane filters for land-based applications generally comprise several membranes filters which are assembled as individual vessels and which are interconnected with small pipework. For such applications, the filters are placed horizontally or vertically and may be grouped in many hundreds of membrane vessels in one installation. This is a well-known configuration for municipal water treatment plants and often cover large areas. This configuration is, however, impractical for subsea use and is in many cases impossible due to the footprint taken up by so many units. The weight would furthermore be too great and the entire system would be prone to be damaged during handling at offshore installations.

U.S. Pat. No. 6,017,451 describes a spider fitting for a multi-module filtration system. A multi-arm spider fitting comprises a central hub from which individual arms radiate. The arms are adapted at their extremities for coupling with filter modules so that multiple filter modules can be secured to a single spider fitting which is spaced around the central hub circumference. The multi-arm spider fitting and filter modules are arranged inside a movable cart. The prior art also includes CN 104226120 A, WO 00/62908 A1, WO 2016/108697 A1, and JP 2004/136173 A, which all describe membrane filter units.

A trend in the oil and gas industry is that hydrocarbons produced from subterranean subsea wells are processed by subsea equipment before further export to onshore plants or topsides facilities. It is therefore necessary to adapt existing designs for use in the harsh subsea environment and for safe handling by applicable and available equipment for subsea installation and intervention.

WO 2016/108697 A1 describes a process system in which a gaseous stream containing a mixture of hydrocarbon gases, $CO_2$ and water vapor is fed into a membrane separator. The membrane generally comprises a polymer material such as PEEK (polyether ether ketone), and allows permeation of $CO_2$ gas and inorganic compounds while retaining the typical hydrocarbon gas components. Exiting from the membrane separator is a retentate stream of enriched hydrocarbon gas and thus a permeate stream comprising $CO_2$ gas and inorganic compounds. Because the pressure drops across the membrane, the permeate stream pressure is lower than the gas feed stream pressure and the retentate stream pressure.

Weight and size of the membrane separator units are crucial parameters, particularly at subsea (seabed) locations, when membrane filters are used for processing well fluids from subterranean hydrocarbon reservoirs. Units with low weights, low heights and small footprint are preferred due to weight and space constraints for the installation vessels, as well as for interface with other seabed components when installed.

There are today several designs for multiple membrane filters and filter packaging. These are, however, based on multiple membrane filters arranged between two plates, one each at the end of a vessel, with the inlet and outlets of two of the membrane ends terminating in each of the two ends. This allows for only one level of membranes with the vessel internal diameter; none of the solutions allow for more than one level of membrane filters. The assemblies are also built up of complicated end seals and retaining plates for sealing the flows from each other at each end of the vessel.

To accommodate more membrane filters, these vessels are increased in diameter to sizes of up to 3 meters or more. No high pressures are normally involved so the vessel wall material thicknesses and body flange sizes are within normal manufacturing possibilities.

For prior art designs suitable for subsea use, any pressure vessel with a body flange should not exceed 42 inches in diameter; this is the present-day (prior art) maximum high-pressure flange available in the form of a compact flange approved for subsea use. API flanges do not normally go to sizes of more than 12 inches in the prior art. It is therefore considered that the largest pressure vessel for subsea use, with a full body flange, shall be no greater than the maximum available compact flange diameter as used subsea and as specified by ISO 27509 (First Edition, Dec. 15, 2012).

The prior art includes the above-mentioned WO 2016/108697 A1 which describes a subsea separation plant where a membrane separator is arranged in a pressure vessel adapted for subsea use. The pressure vessel comprises two housing parts interconnected by respective flanges, and has a gas inlet opening for receiving gas to be treated, a retentate outlet opening, and a permeate outlet opening. A membrane cartridge assembly is made up of a plurality of membrane cartridges. Each membrane cartridges comprises an outer sleeve which houses a substantially cylindrical membrane element. An opening in each sleeve allows gas to enter the cartridge and to flow past the membrane element.

While the prior art membrane separators configured for subsea use are compact in comparison to land-based membrane separator systems, further improvements are still needed in order to cope with increasing demands for compactness, retrievability, reliability and the ability to withstand harsh conditions (including extreme external pressures).

The prior art also includes US 2013/0168307 which describes a pressurized cylindrical filtration vessel comprising a filter element made up of a plurality of filtration membrane modules (e.g., ultrafiltration membrane modules), a distributor connected to an inlet for distributing an input fluid to the filter element, and a collector connected to an outlet for collecting an output fluid from the filter element. Multiple membrane filters are arranged in a single level between two end plate arrangements. The collection/distribution region is the pressure vessels end, which is provided as a flanged elliptical domed region retained by clamps or bolted in place. This document shows a complex build-up of seal plates, seals and attachments which are required to isolate each end from the rest of the vessel. These types of designs often require two vessel body flanges which again add to the weight of the vessel. Any problem with an individual membrane filter will also require a complete dismantling of the assembly to access and remove or replace the membrane filter.

The installation and retrieval of a process unit to or from a seabed location can incur high costs and risk. It is therefore important that this operation can be performed efficiently with a minimum of down time. One major factor in reducing downtime is to minimize the weight of the process unit being handled. Interest has developed over recent years for more compact process units/modules, in particular for operations in deep waters (e.g., to 3000 meters water depth) were the external pressures exerted on equipment requires extreme material strength which in turn adds to material being thicker and hence heavier (typically pressure vessels). In addition to the need for handling lighter units, their weather deployment operational window can be greatly increased.

Many removable subsea process units are heavy due to their surrounding structural supports and/or protection frame, together with the process unit vessel (e.g., outer body), connection devices, piping and valves etc. Most subsea intervention requirements for filtration equipment relate to the internal components and would normally require renewal, reconfiguring or cleaning etc. Due to changes in well stream characteristics, the process unit could in some cases be better favored with an alternative type or number of filter units.

SUMMARY

The present invention provides a filter device which includes a common inlet manifold, a common outlet manifold and at least two membrane filter units which are configured to be elongated. Each of the at least two membrane filter units comprise an inlet opening for a fluid flow to be processed, a first outlet opening for at least a retentate portion of the fluid flow, and a second outlet opening for at least a remaining portion of the fluid flow. Each inlet opening of each of the at least two membrane filter units is fluidly connected to the common inlet manifold, and each first outlet opening of each of the at least two membrane filter units is fluidly connected to the common outlet manifold. At least one of the at least two membrane filter units is arranged at a first position along a longitudinal axis, at least another one of the at least two membrane filter units is arranged at a second position along the longitudinal axis, the two membrane filter units being staggered with respect to each other and not being axially aligned with respect to each other. The at least one of the at least two membrane filter units is fluidly connected to the common inlet manifold and to the common outlet manifold via a first set of conduits, and the at least another one of the at least two membrane filter unit is fluidly connected to the common inlet manifold and to the common outlet manifold via a second set of conduits.

BRIEF DESCRIPTION OF THE DRAWINGS

The present invention is described in greater detail below on the basis of embodiments and of the drawings (not to scale), which are given as non-restrictive examples, in which:

FIG. 13 is an enlarged view of the area marked "C" in FIG. 12, however, as a partly exploded view;

FIG. 14 is an enlarged view of the area marked "D" in FIG. 12, however, as a partly exploded view;

FIG. 15 is a view from above, along the longitudinal axis, of the embodiment illustrated in FIG. 12;

FIG. 19 is a sectional side view of a variant of the first section of the pressure vessel illustrated in FIGS. 16-18;

FIG. 20 is a sectional side view of a variant of the second section of the pressure vessel illustrated in FIGS. 16-18;

FIG. 21 is a schematic drawing of a fourth embodiment of a unitary membrane filter cartridge comprising six membrane filter units connected to common manifolds and associated conduits;

FIG. 22 is an exploded view of the embodiment illustrated in FIG. 21, without the membrane filter units;

DETAILED DESCRIPTION

Figure 1:
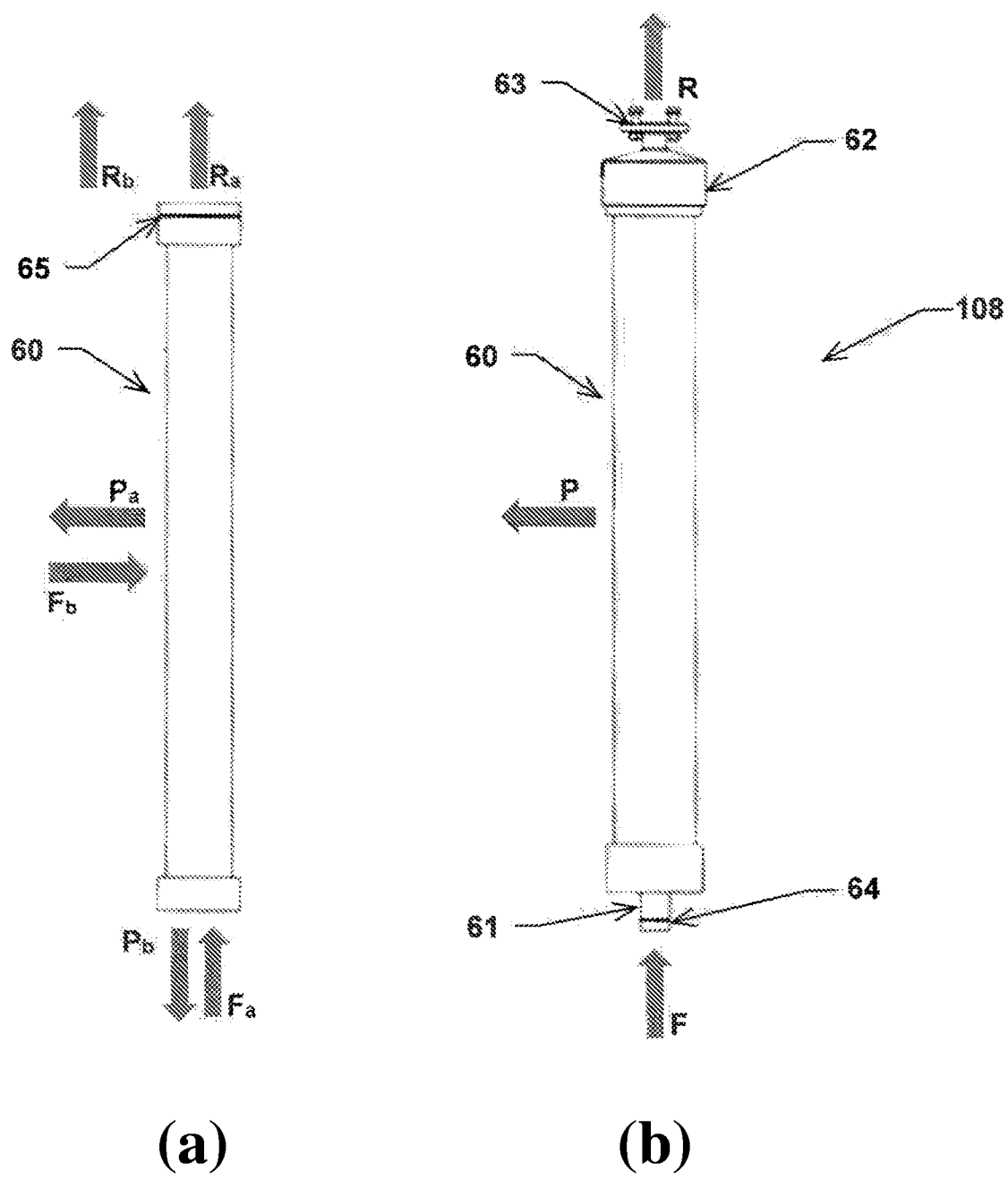
FIG. 1 shows (a) a side view of a typical membrane filter and (b) an embodiment of a membrane filter unit comprising a membrane filter, end cap and fittings.

The present invention thus provides a filter device comprising two or more membrane filter units, each having an inlet opening for a fluid flow to be processed, a first outlet opening for at least one portion of said fluid flow and second outlet port for at least a remaining portion of said fluid flow, and the respective inlet openings of each membrane filter unit are fluidly connected to a common inlet manifold and the respective first outlet openings of each membrane filter unit are fluidly connected to a common outlet manifold, characterized in that at least one membrane filter unit is arranged at a first position along a longitudinal axis and at least one membrane filter unit is arranged at a second position along the longitudinal axis, and the said two membrane filter units are not axially aligned.

The manifolds may be structurally interconnected by a connection device or may be welded, glued, bolted, or otherwise interconnected, to form a unitary membrane filter cartridge.

In an embodiment, the membrane filter units can, for example, be elongated members that are arranged along a longitudinal axis of the unitary membrane filter cartridge.

The inlet manifold and the outlet manifold of a plurality of membrane filter cartridges may be connected to a respective augmented inlet manifold and augmented outlet manifold to form an augmented unitary membrane filter cartridge.

In an embodiment, the membrane filter units can, for example, be arranged at different positions along a longitudinal axis of the unitary membrane cartridge. The unitary membrane filter cartridge and the augmented unitary membrane filter cartridge may each form unitary, elongated, bodies around a common longitudinal axis.

In an embodiment, the unitary membrane filter cartridge and the augmented unitary membrane filter cartridge can each, for example, be configured to be inserted into a pressure-retaining device having a circular cross-section, such as a pressure vessel or pipe.

A plurality of unitary membrane filter cartridges may be fluidly and structurally interconnected in an end-to-end relationship to form a cartridge string.

In an embodiment, the augmented unitary membrane filter cartridge can, for example, comprise a structural connection device whereby the membrane filter cartridge may be connected to, and supported by, a first pressure vessel part as one single unit.

The structural connection device may comprise an interlocking member which is configured to provide structural integrity and to lock the membrane filter units and manifolds together. The interlocking member may be connected to the inlet manifold and to the outlet manifold.

The present invention also provides a membrane filter unit, characterized by the filter device according to the present invention, arranged in a pressure vessel and being fluidly connected to an inlet port and an outlet port of the pressure vessel, the pressure vessel further comprising an opening through which filtered fluid may pass.

The filter device according to the present invention may be used at a subsea location, where the one or more unitary membrane filter cartridges or one or more augmented unitary membrane filter cartridges are arranged in a pipe or a pressure vessel, and a hydrocarbon fluid is flowed into an inlet port of the device and a retentate is flowed out of an outlet port of the device. The device may be placed on a seabed location in an upright (substantially vertical) orientation or in a substantially horizontal orientation.

The present invention also provides a method of installing a plurality of membrane filter units into a pressure vessel, characterized by the steps of:

forming one or more unitary membrane filter cartridges or one or more augmented unitary membrane filter cartridges according to the present invention; and inserting the unitary membrane filter cartridge(s) or augmented unitary membrane filter cartridge(s) into a pressure vessel as one integral unit.

The inserting step may be preceded by connecting the unitary membrane filter cartridge to a first pressure vessel part, whereby the cartridge and first pressure vessel part may be handled as one unit.

The present invention enables the packaging of multiple membrane filter units as a single unitary cartridge, or augmented cartridges, for installation into the confined space of a pressure retaining device, such as a pipe or a pressure vessel.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the present invention. The terms are used for the reader's convenience only and shall not be limiting.

The present invention relates to the assembly of multiple (i.e., two or more) membrane filters to form a unitary cartridge for insertion into a pressure retaining device, such as a cylindrical vessel or a pipe. In the embodiments described below, the membrane filter is an ultra-filtration unit, which is well known in the art. One example of such a membrane filter 60 is shown in FIG. 1 above (a). The membrane filter has generally one process flow into the filter, and two process flows out. The process flow into the filter is unfiltered, and one portion of the process flow passes through the membrane (the permeate P), while the remaining portion of the process flow exits along the hollow fibers of the membrane (the retentate). Two flow scenarios are illustrated in (a) of FIG. 1. Reference sign $F_a$ designates the unfiltered flow into the membrane filter, $R_a$ designates the retentate, while $P_a$ designates the permeate flow. In a reversed-flow process, unfiltered flow $F_b$ is flowed towards the membrane, permeate $P_b$ flows out of the membrane, while the retentate $R_b$ does not pass through the membrane. The skilled person will understand that in a practical application, the membrane filter is encased by a vessel (not shown in (a) of FIG. 1). Although the present invention is applicable to both flow scenarios, it should be understood that the former is the most commonplace. It should be understood that the membrane filter can be orientated in either a vertical or a horizontal direction, and that the flow pattern is commonly described relative to its orientation.

The membrane filter 60 can have many different forms at the filter ends. Whatever the form is, however (whether plain or fitted with connections such as a pipe insert or flanged ends), the design would be modified to suit the connecting parts and does not deter from the form of the present invention.

FIG. 1 (b) illustrates how the membrane filter 60, in a practical application, is furnished with an end cup 62 (at the retentate end R) and an end pipe fitting 61 at the process inflow end F. The end cup 62 is furnished with a flange 63 for firm connection to further pipework, and the end cup 62 is fitted to the retentate end R of the membrane filter 60 via an O-ring 65 in order to seal the retentate end R to the end cup 62. This secure and flanged connection is necessary as there is normally a large pressure drop across this end of the membrane filter. The end pipe fitting 61 is furnished with an O-ring seal 64, which is configured to sealingly engage with a socket (not shown in (b) of FIG. 1), which is described below. This end of the membrane filter normally has very little pressure difference, and does therefore not require to be configured as a flanged end.

The membrane filter 60, end pipe fitting 61, and end cup 62 will in the following generally be referred to as a membrane filter unit 108. It should be noted, however, that the illustrated flanged end cup and O-ring seals are only one example of many possible connections. Other connections could, for example, be welded, clamped or screwed. Such connections are well known to the skilled person and do not therefore need to be described in further detail.

Figure 2:
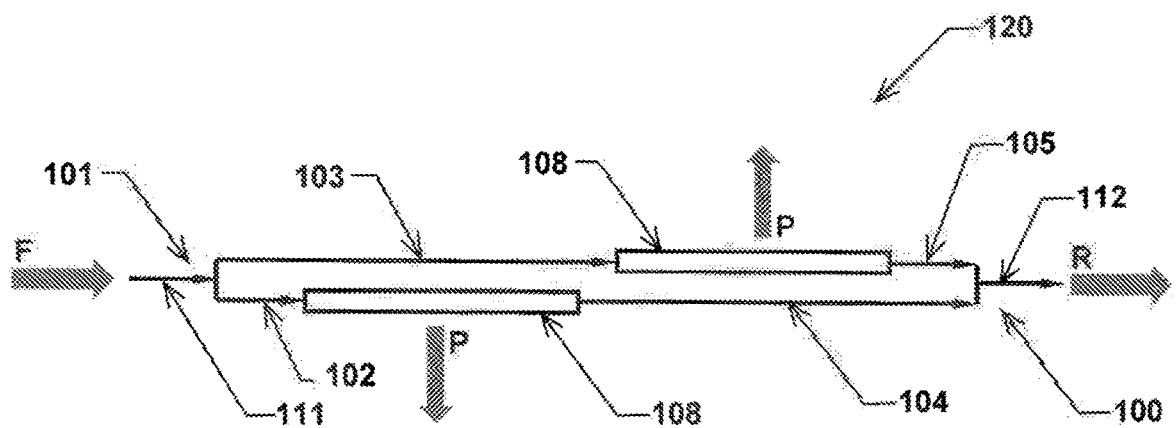
FIG. 2 is a schematic drawing of a first embodiment of a unitary membrane filter cartridge comprising two membrane filter units connected to common manifolds and associated conduits.
Figure 3:
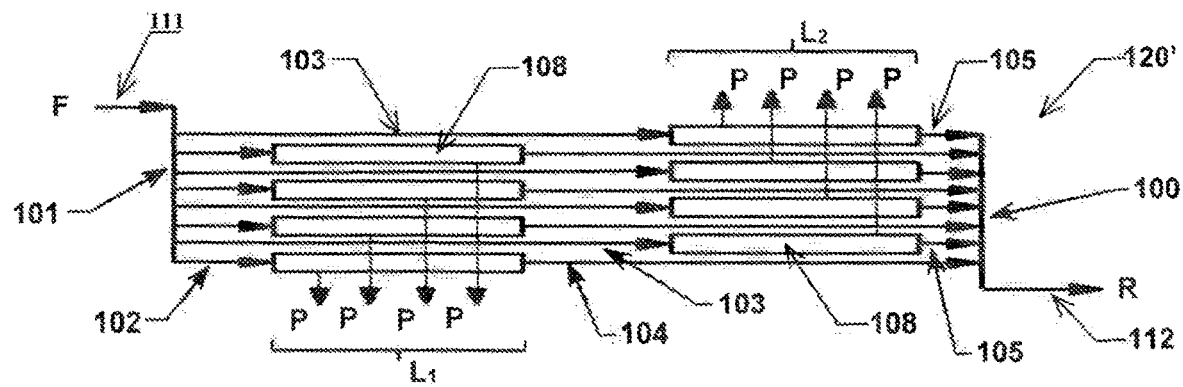
FIG. 3 is a schematic drawing of a second embodiment of a unitary membrane filter cartridge comprising eight membrane filter units connected to common manifolds and associated conduits.

Referring now to FIG. 2, the apparatus of the present invention comprises in its most basic form a plurality (i.e., two or more) membrane filter units 108 arranged in parallel and connected to common manifolds 100, 101, which are in turn each connected to inlet conduit 111 and outlet conduit 112, respectively. In the illustrated embodiment, one membrane filter unit 108 is fluidly connected to the manifolds via a first set of conduits 103, 105 and the other membrane filter unit 108 is fluidly connected to the manifolds via a second set of conduits 102, 104. In the first set of conduits 103, 105, the first conduit 103 is longer than the second conduit 105. In the second set of conduits 102, 104, the first conduit 102 is shorter than the second conduit 104. It will be noted that the total lengths of both flowpaths are the same (i.e., length of: first conduit 103+membrane filter unit 108+second conduit 105=length of: first conduit 102+membrane filter unit 108+second conduit 104). This assembly of membrane filter units 108 thus forms a unitary membrane filter cartridge 120, i.e., a cartridge that may be handled as one entity. The conduits 102-105 may be pipes of a design which is commonly used in the industry. The conduits 102-105 generally have similar outer diameters, and these diameters are considerably smaller that the outer diameters of the membrane filter unit 108. This feature, together with the lengthwise staggered arrangement of the membrane filter units 108, allow the membrane filter units 108 to be arranged close together. In the context of this description, "staggered" shall mean that the membrane filter units 108 are arranged at different lengthwise positions along the longitudinal axis and thus not axially aligned.

Referring now to FIGS. 3 to 9, another embodiment of the unitary membrane filter cartridge 120' will be described. In this embodiment, the unitary membrane filter cartridge 120' comprises eight membrane filter units 108, and each membrane filter units 108 is fluidly connected at a first end to a first manifold 100 and at a second end to a second manifold 101. The manifolds comprise internal chambers and are fitted with a number of pipes common at one end to the chamber. The first manifold 100 comprises second conduits (pipes) 104, 105 furnished with flanges 107, configured for connection to the flange 63 (see (b) of FIG. 1) on a respective membrane filter unit 108. The second manifold 101 comprises first conduits (pipes) 102, 103 furnished with sockets 106, configured for connection to the inflow end pipe fitting 61 (see (b) of FIG. 1) on a respective membrane filter unit 108. During the assembly procedure, the end pipe fitting 61 with O-ring seal 64 is inserted into respective socket 106, whereupon the flange 63 is attached to a corresponding flanged termination 107.

For use in a subsea environment, modules for installation onto the seabed are restricted to a height of around 8 meters as this suits the service vessel's installation module handling lifting equipment. Any pressure vessel housing the membrane filter should therefore be within the subsea module height, and this will normally limit the number of membrane filter cartridges in a pressure vessel to two, one above the other. Other forms of the same idea can be used in multiple stacks for insertion into a long pipe, as is described below.

Figure 5:
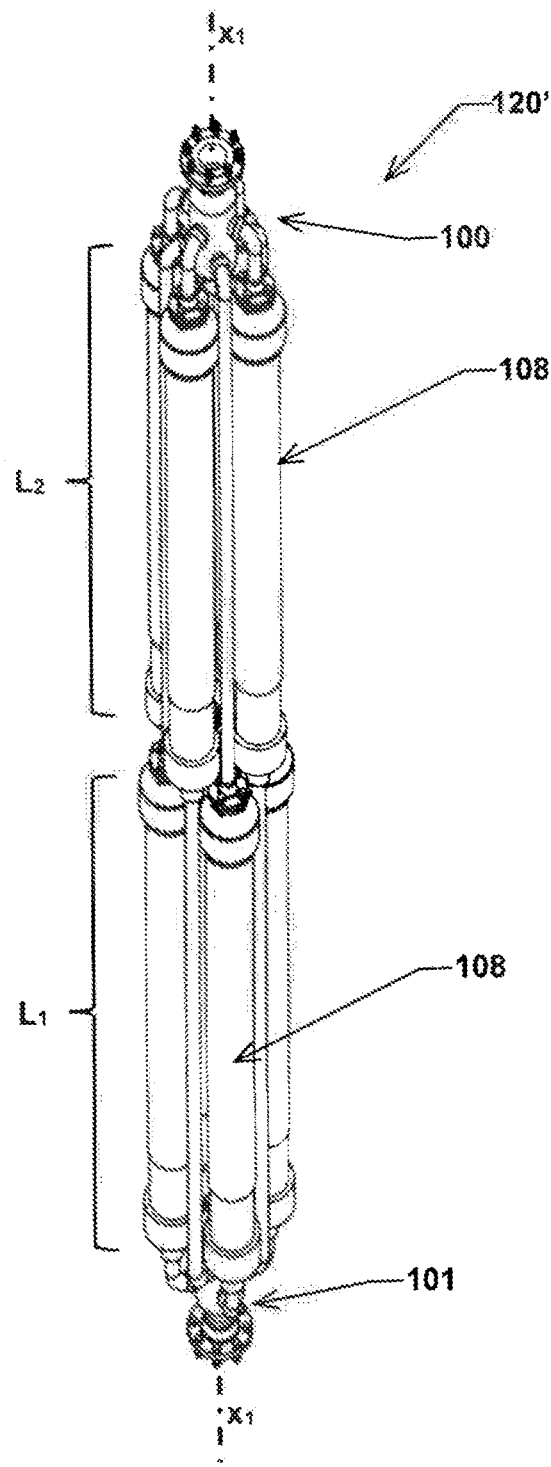
FIG. 5 is a perspective drawing of the embodiment illustrated in FIG. 4, in an assembled state.
Figures 8, 9:
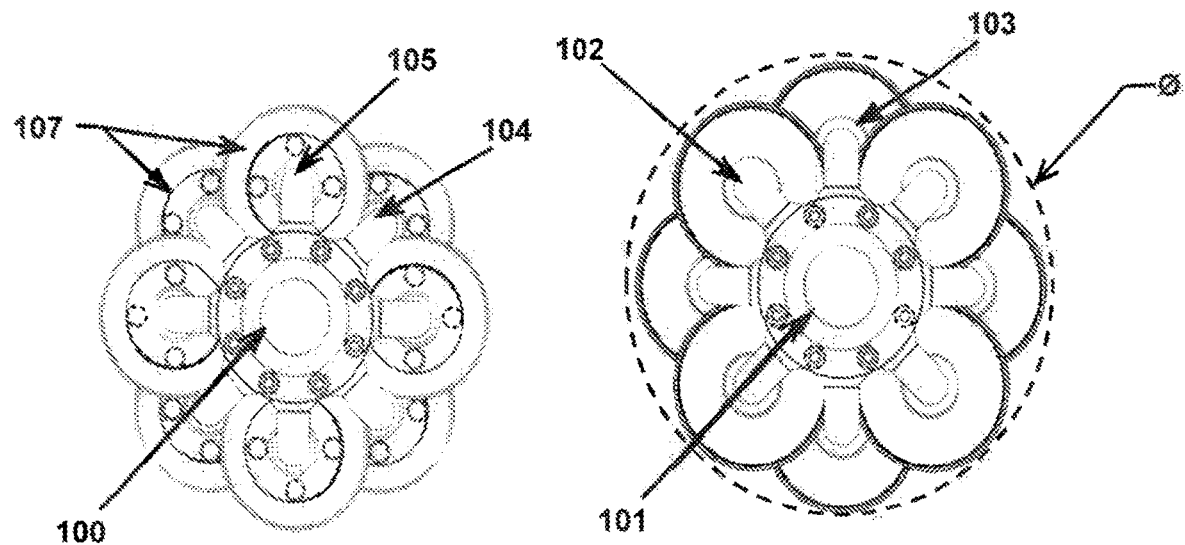
FIG. 8 is a view from above, along the longitudinal axis, of the embodiment illustrated in FIG. 5.
FIG. 9 is a view from below, along the longitudinal axis, of the embodiment illustrated in FIG. 5.

In the illustrated embodiments, the membrane filter units 108 are therefore grouped in two levels $L_1$, $L_2$ (lower and upper, if the unitary membrane filter cartridge 120' is arranged in an upright position, as shown in FIG. 5). These levels are staggered with respect to each other, and not axially aligned. The retentate end of a membrane filter unit in a first level $L_1$ is thus connected to the first manifold 100 via a second conduit (pipe) 104 which is longer than the membrane filter unit to which it is connected. The inflow end of a membrane filter unit in the first level $L_1$ is connected to second manifold 101 via a shorter first conduit (pipe) 102. The retentate end of a membrane filter unit in a second level $L_2$ is correspondingly connected to the first manifold 100 via a shorter second conduit (pipe) 105, while the inflow end is connected to the second manifold 101 via a first conduit (pipe) 103 which is longer than the membrane filter unit to which it is connected. As explained above with reference to FIG. 2, this configuration allows the membrane filter units 108 to be brought closer together (towards the longitudinal axis $x_1$), whereby the circumference may be reduced. This is illustrated in FIGS. 8 and 9, where the circumference Ø is indicated in FIG. 9.

Figure 4:
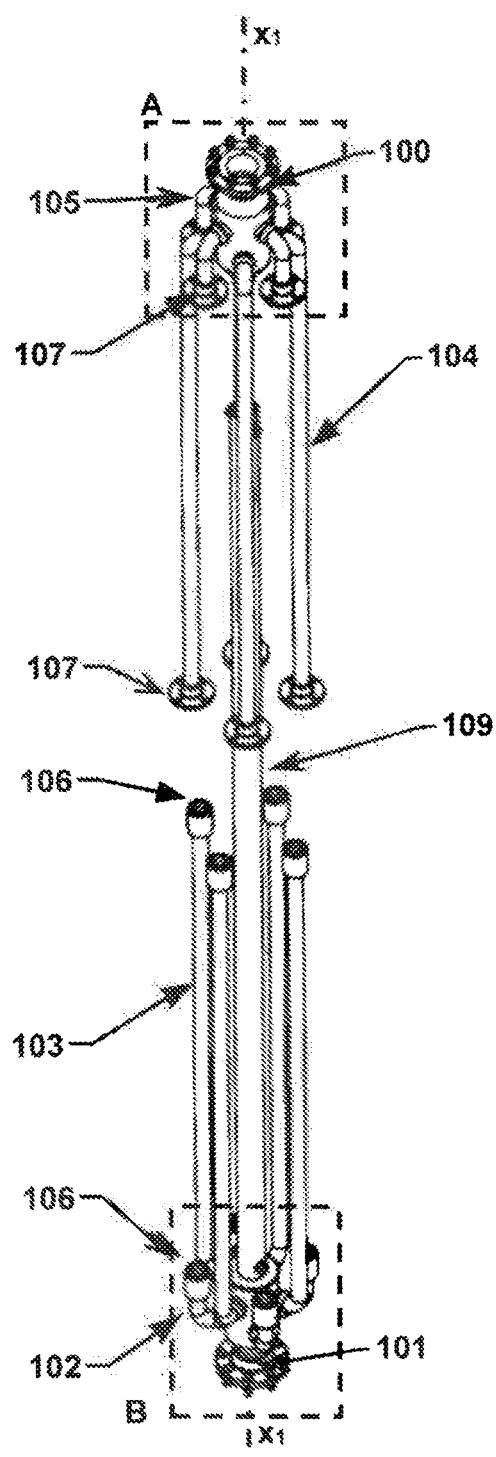
FIG. 4 is a perspective drawing of the embodiment illustrated in FIG. 3, in a partly assembled state.
Figures 6, 7:
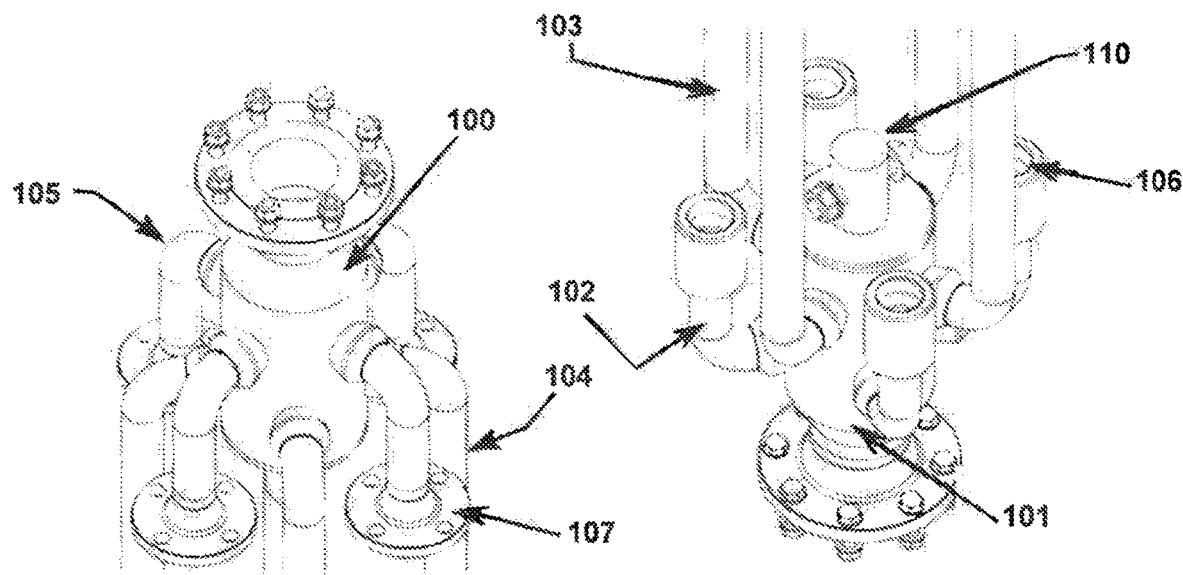
FIG. 6 is an enlarged view of the area marked "A" in FIG. 4.
FIG. 7 is an enlarged view of the area marked "B" in FIG. 4, however, with certain parts removed for illustration purposes.

In the embodiment illustrated in FIG. 4, the upper first manifold 100 and the lower second manifold 101 are joined together by a connecting bar 109, which is bolted to corresponding connection members 110. The connection member 110 on the second (lower) manifold is illustrated in FIG. 7. The connecting bar 109 serves as a structural member to hold the first (upper) and second (lower) manifolds together and thus lock the membrane filter units 108 in place, so that the unitary membrane filter cartridge 120' may be handled as one structural entity. This connecting bar 109 is useful as it allows the pipes to simply be plugged into their respective sockets. It should be understood that the connecting bar 109 is not required if the pipes, sockets and manifold are welded, glued, bolted, or otherwise interconnected.

It will be understood that the unitary membrane filter cartridge 120' can be used as a single cartridge in a small diameter vessel or as a combination of a plurality of cartridges joined together to form a larger cartridge for installation into a large diameter vessel.

Figure 10:
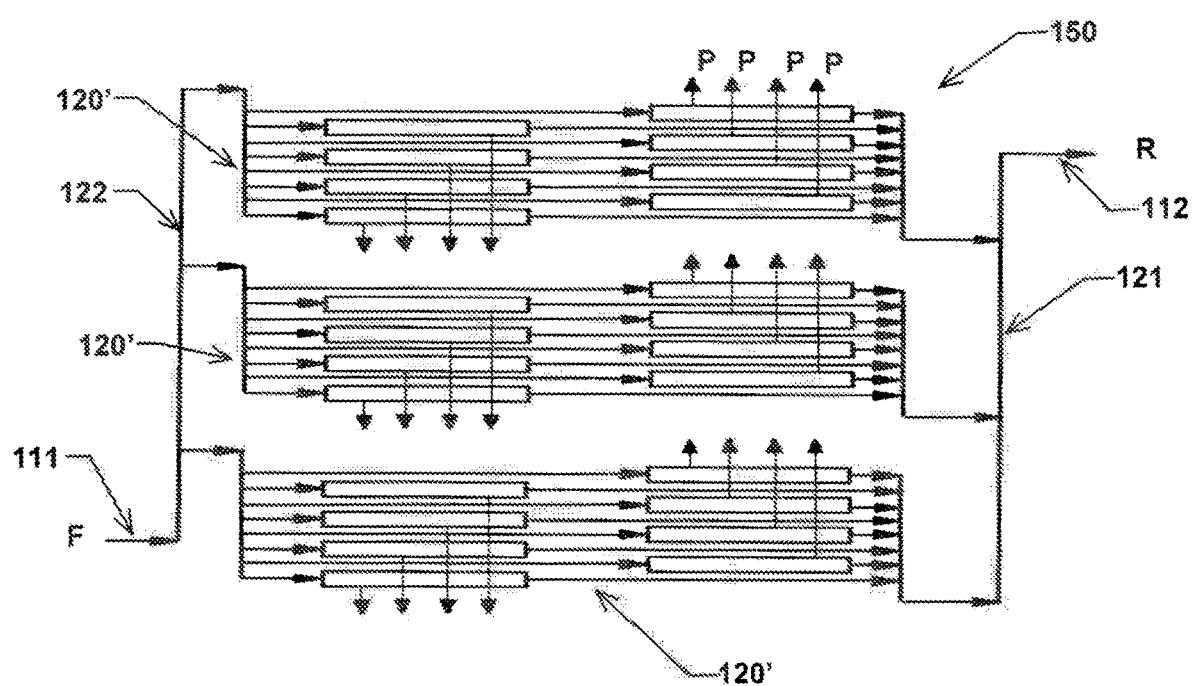
FIG. 10 is a schematic drawing of a third embodiment of a unitary membrane filter cartridge comprising three unitary membrane filter cartridges of the second embodiment connected to common manifolds and associated conduits.
Figure 11:
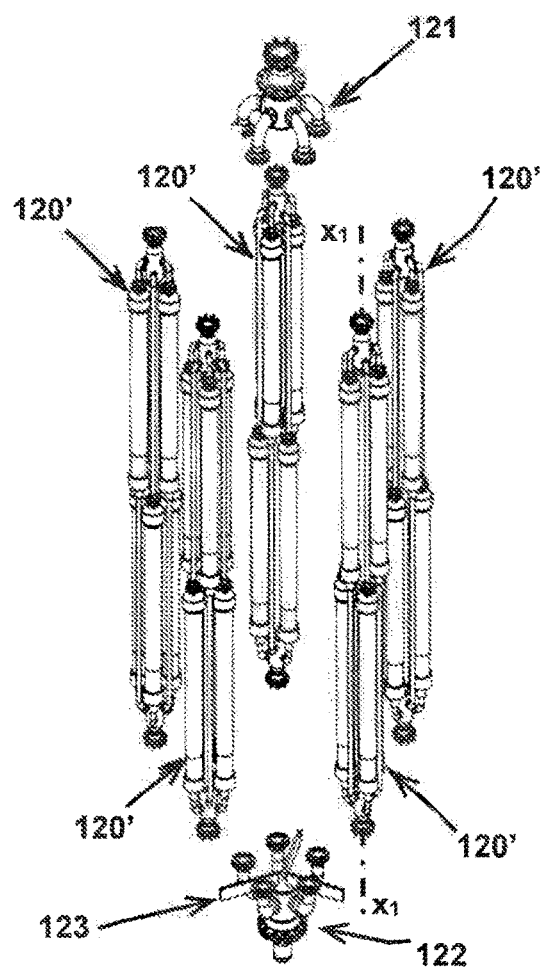
FIG. 11 is an exploded view of the embodiment illustrated in FIG. 10.
Figure 12:
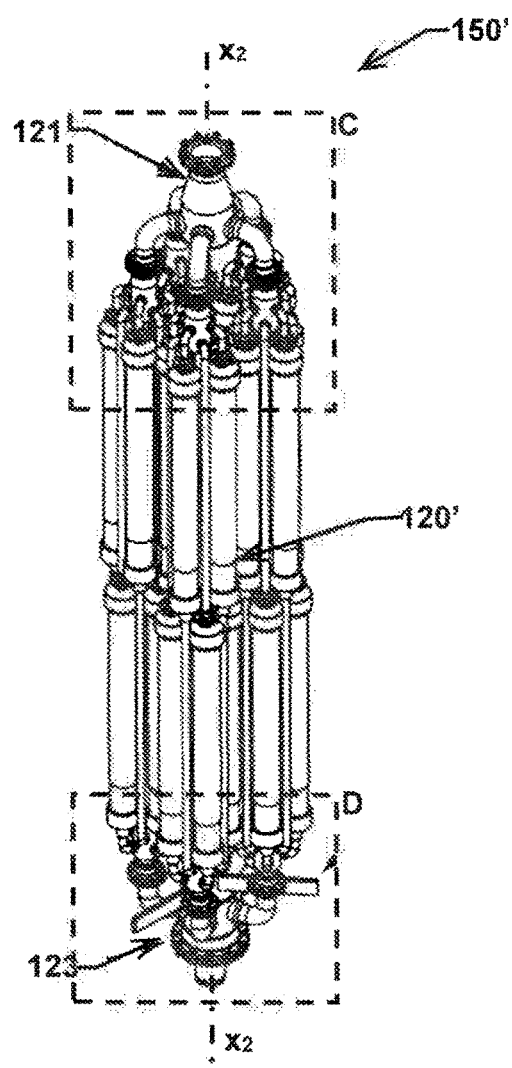
FIG. 12 is a perspective drawing of the embodiment illustrated in FIG. 11, in an assembled state.

The latter is indicated schematically in FIG. 10, where a plurality of (i.e., three) unitary membrane filter cartridges 120' are interconnected to form an augmented unitary membrane filter cartridge 150.

FIGS. 11 to 15 illustrate a corresponding embodiment where a plurality of (i.e., five) unitary membrane filter cartridges 120' are interconnected to form an augmented unitary membrane filter cartridge 150'. This configuration is useful when a large numbers of membrane filter units are to be installed in a subsea pressure vessel with a height restriction. The individual unitary membrane filter cartridges 120' are connected at their process inflow ends F (via respective second manifolds 101) to a first augmented manifold 122 and at their retentate outflow ends R (via respective first manifolds 100) to a second augmented manifold 121. Reference number 125 (see FIG. 13) denotes a flange on the second (upper) first augmented manifold, while reference number 124 (see FIG. 14) denotes an O-ring seal on the first (lower) augmented manifold. Each manifold comprises an internal distribution chamber, which is well known in the art. The first (lower) augmented manifold comprises a centering guide 123 to aid alignment with the pipe or pressure vessel during installation (described below).

Figures 16, 17, 18:
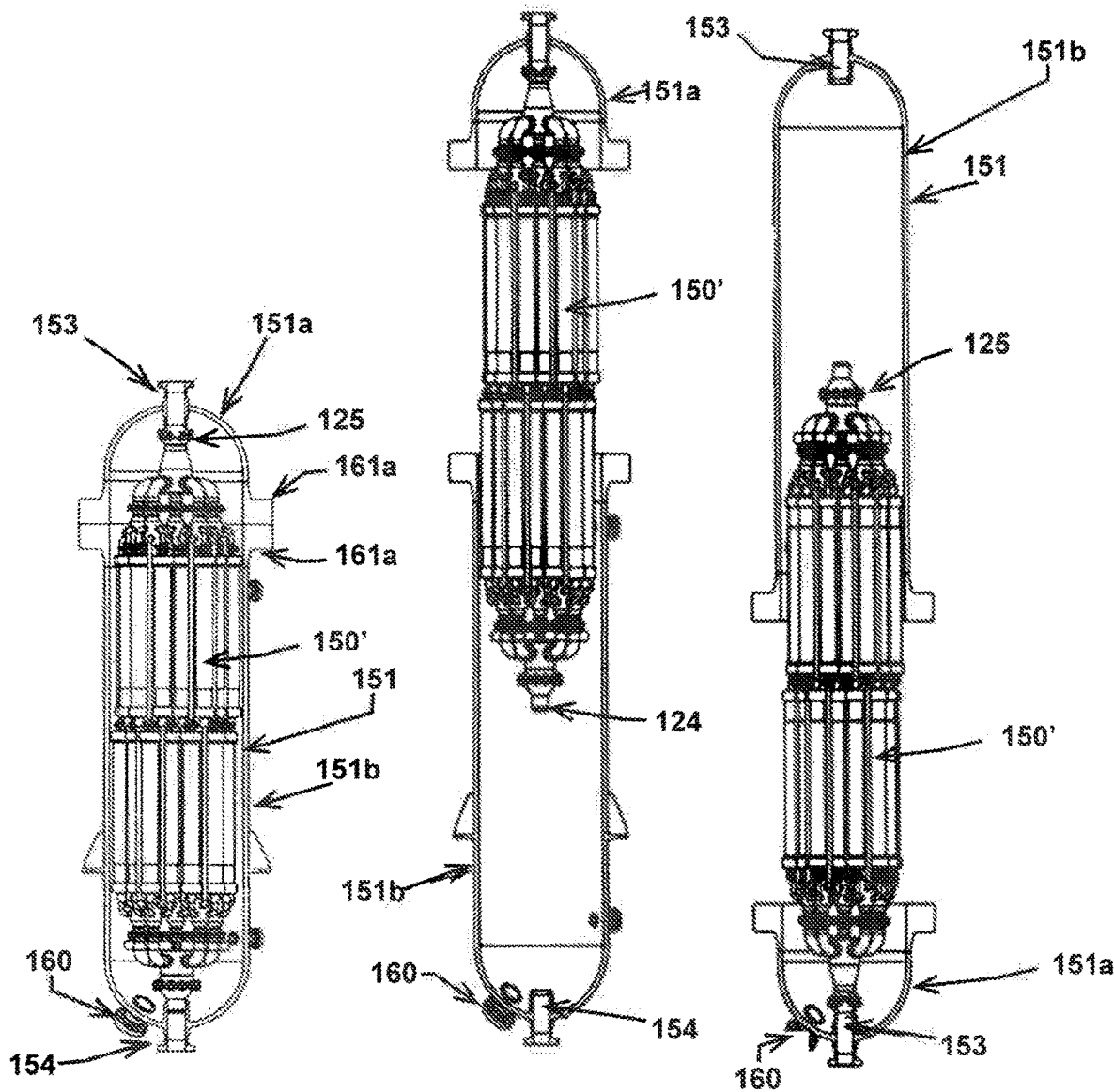
FIG. 16 is a sectional side view of the embodiment illustrated in FIG. 12, installed in a pressure vessel.
FIG. 17 is a sectional side view of the embodiment illustrated in FIG. 12 connected to a first section of a pressure vessel and partly inserted into a second section of the pressure vessel.
FIG. 18 corresponds to FIG. 17, but shows a reversed orientation.

FIG. 16 illustrates the augmented unitary membrane filter cartridge 150' installed in a pressure vessel 151. The pressure vessel comprises two (first and second) sections 151a,b, in the views shown in FIGS. 16 and 17, which are referred to as upper and lower sections, interconnected via releasable flanges 161a,b. The cartridge top flange 125 (typically the retentate end R) is connected to a flange inside the pressure vessel first section 151a, which in turn is connected to a nozzle 153 (for connection to further pipework). The O-ring seal 124 on the first (lower) augmented manifold 122 is configured connection into a stab nozzle 154 in the bottom of the lower pressure vessel second section 151b. As the skilled person will understand, this connection (typically process flow inlet) is suitable with an O-ring seal as the connection is exposed to only a small pressure difference. Reference number 160 designates the permeate outlet. It should be understood that required valves and piping to operate the membrane filters are not illustrated, as such parts and devices are well known in the art.

One advantage with all of the embodiments of the present invention is that the individual membrane filter units 108 are connected to form a unitary membrane filter cartridge 120; 120' or an augmented unitary membrane filter cartridge 150; 150'. Each membrane filter cartridge may thus be pre-assembled (e.g., at an onshore location) and easily and quickly be installed (inserted) into its designated pressure vessel (e.g., at an offshore location). One such installation method is illustrated in FIG. 17 where the augmented unitary membrane filter cartridge 150' has been connected to the pressure vessel first section 151a and is in the process of being inserted into the pressure vessel second section 151b (cranes and lifting gear not being shown). A reverse procedure may be used for removing the cartridge.

In FIG. 18, the assembled augmented unitary membrane filter cartridge 150' and pressure vessel first section 151a are placed in an upright orientation, and the pressure vessel second section 151b is lowered over the cartridge. In this variant, the pressure vessel first section 151a comprises the permeate outlet 160. The variant shown in FIG. 18 is useful in certain instances where, for large assemblies, it is advantageous for the cartridge to be mounted into a pressure vessel lower end. This allows for the assembly to be built-up in a workshop ground floor and not have the cartridge assembly hanging in a crane. There also exist possibilities for all connections in and out of the pressure vessel to only be mounted in the pressure vessel lower end; this allows for the top body shell to only be a pressure retaining cover. This can be an advantage for subsea modules reducing the amount of external piping.

FIGS. 19 and 20 show alternative positions for the flow nozzles in the pressure vessel. Reference number 158 denotes a lateral outflow (retentate) port, whereas reference number 159 denotes a lateral inflow (unfiltered process flow) port. Any combination of these may be used, and an advantage of using such side entry for the flow into the cartridge is that the outflow from the membranes into the vessel inner volume (e.g., permeate) may pass through the vessel bottom, which allows for a self-draining of the whole assembly.

Figure 23:
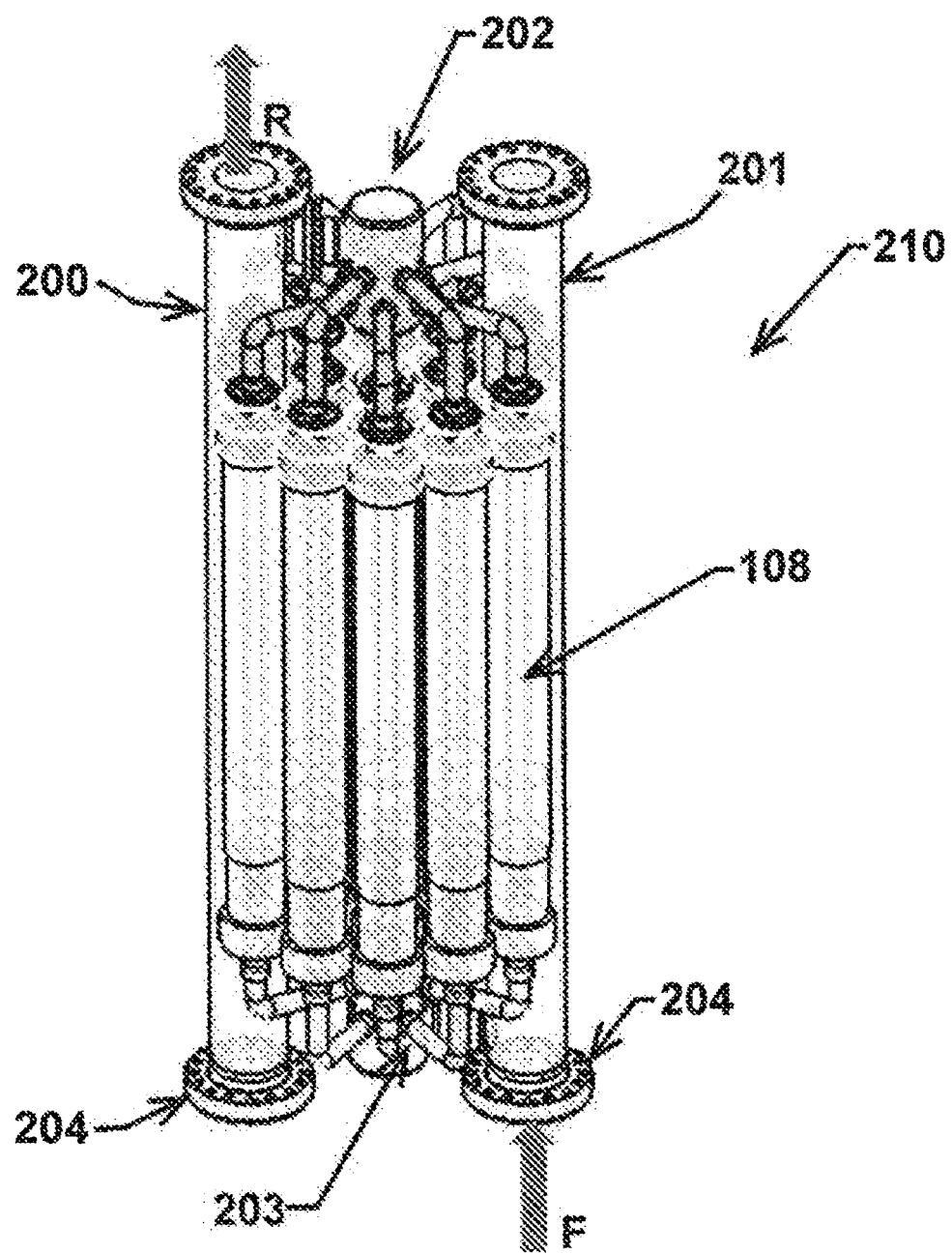
FIG. 23 is a perspective view of the embodiment illustrated in FIG. 21.
Figure 24:
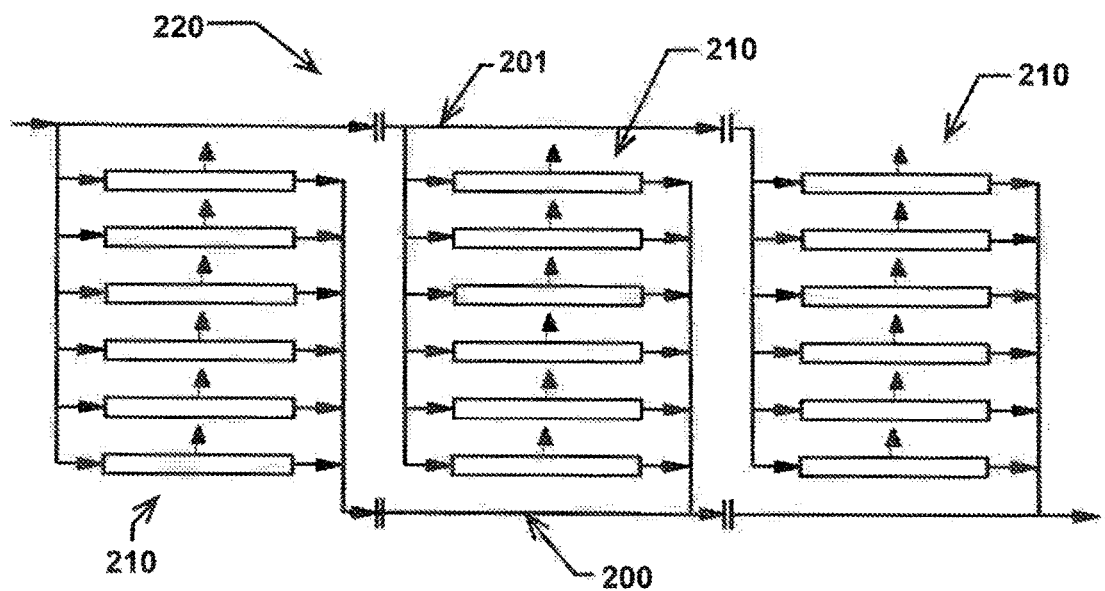
FIG. 24 is a schematic drawing of a fifth embodiment of a unitary membrane filter cartridge comprising three unitary membrane filter cartridges of the fourth embodiment connected to common manifolds and associated conduits.
Figure 25:
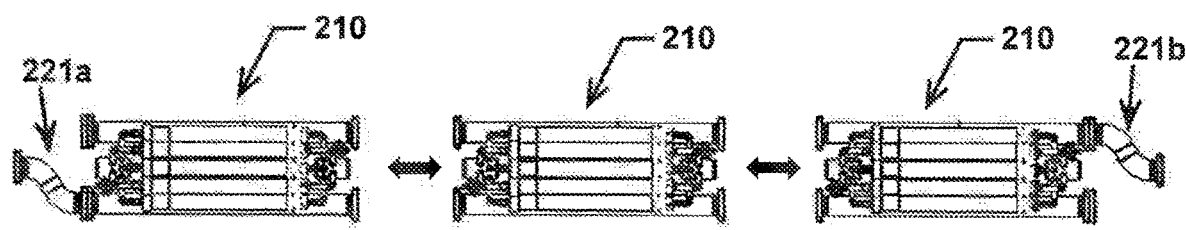
FIG. 25 is a side view of three unitary membrane filter cartridges according to the embodiment illustrated in FIG. 23 in a disassembled state.
Figure 26:
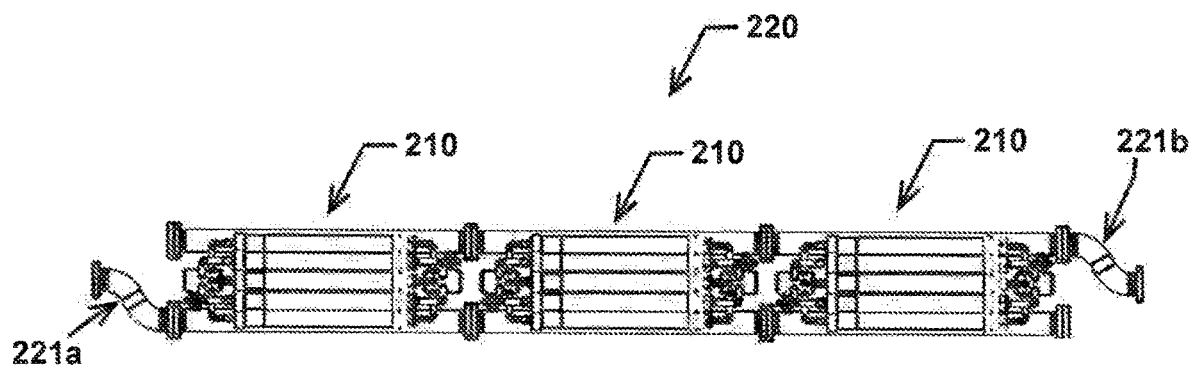
FIG. 26 correspond to FIG. 25 and shows the three unitary membrane filter cartridges in an assembled state, forming the fifth embodiment illustrated in FIG. 24.

FIGS. 21 to 23 illustrate yet another embodiment of a unitary membrane filter cartridge, which is denoted with reference numeral 210. Six membrane filter units 108 are here arranged in parallel and connected to common manifolds (or headers) 202, 203 via respective flowpipes. A first manifold 202 is connected to the upper (retentate) end of the membrane filter units, and a second manifold 203 is connected to the lower (process inflow) end of the membrane filter units. A first transport pipe 200 is connected to the first manifold 202, and is in the illustrated embodiment configured for transporting retentate R. A second transport pipe 201 is connected to the second manifold 203, and is in the illustrated embodiment configured for transporting unfiltered process inflow F. Referring additionally to FIGS. 24 to 26, the transport pipes 200, 201 are interconnected (e.g., via flanges 204) to similar transport pipes of corresponding unitary membrane filter cartridges 210 to form an augmented unitary membrane filter cartridge 220, which is also referred to below as a cartridge string 220. The assembly process is indicated in FIG. 25, and a completed cartridge string 220 comprising three unitary membrane filter cartridges 210 is illustrated in FIG. 26. The transport pipes are connected to termination pipes 221a,b. It should be understood that one such cartridge string 220 may comprise two or more membrane filter cartridges 210.

Figure 27:
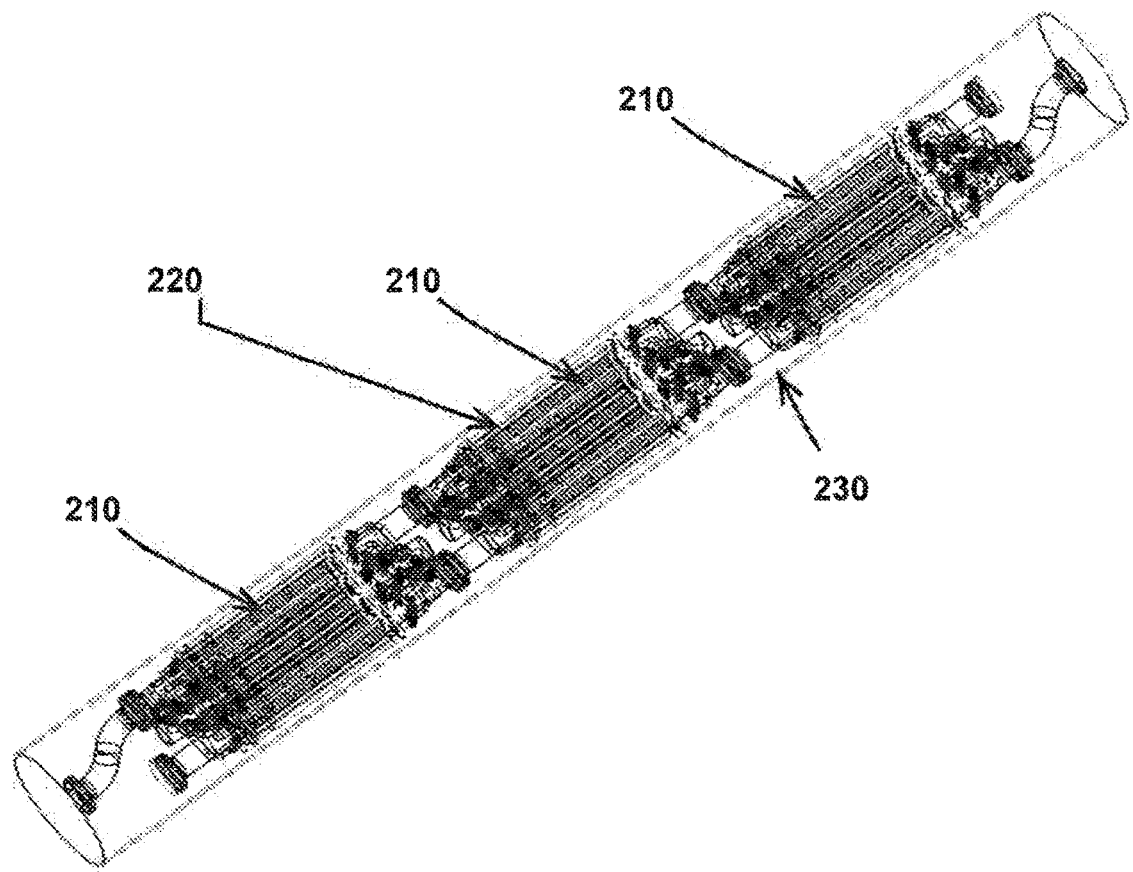
FIG. 27 is a perspective view of the unitary membrane filter cartridge illustrated in FIG. 26 installed in a pipe.
Figure 28:
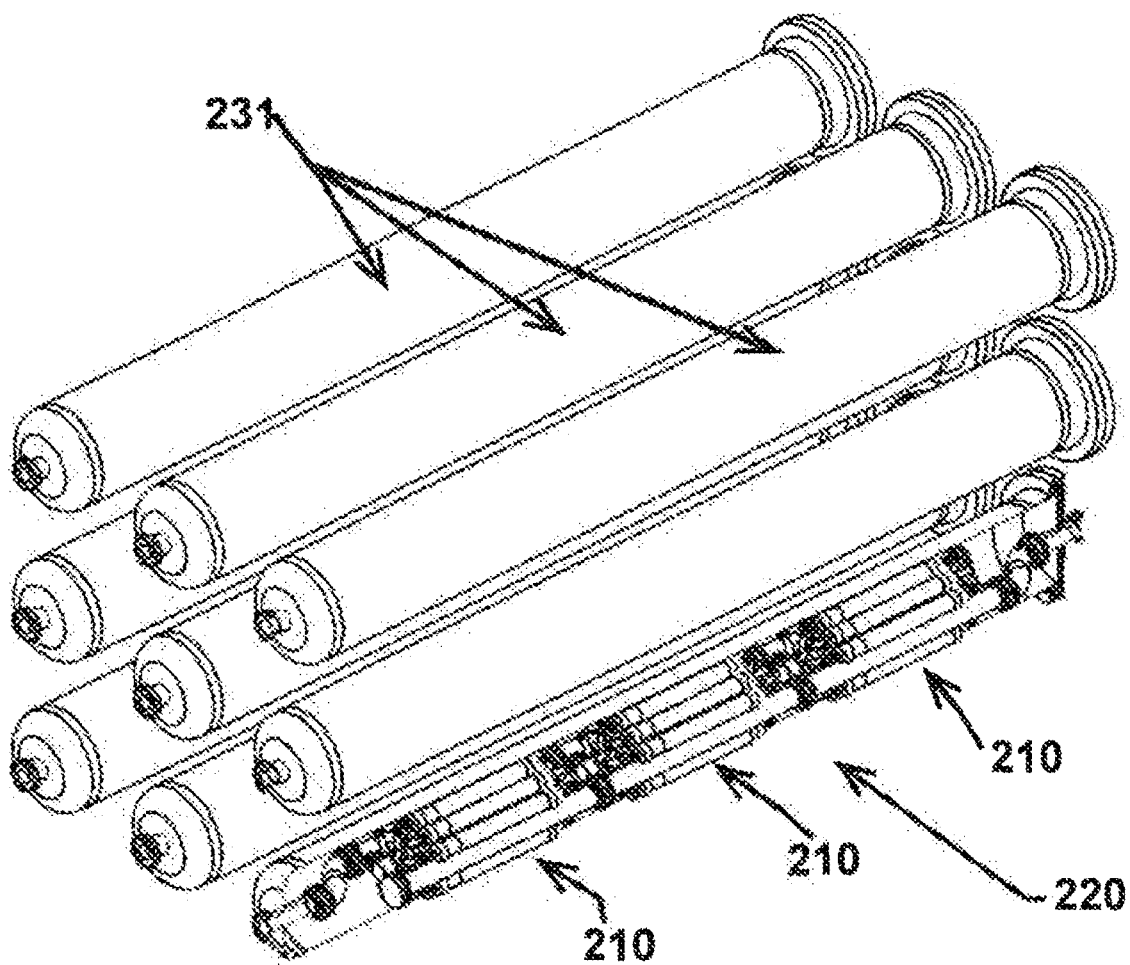
FIG. 28 is a perspective view of the unitary membrane filter cartridge illustrated in FIG. 26 installed in a pipe.

The cartridge string 220, or a single unitary membrane filter cartridge 210, may be inserted into a pipe 230, as illustrated in FIG. 27. A cartridge string 220, or a single unitary membrane filter cartridge 210, may also be inserted into a pressure vessel 231, as illustrated in FIG. 28. An array of nine pressure vessels 231 (three by three) here contains a total of 436 membrane filter units (9×48). This is an example of how many membrane filter units can be installed in a confined space using pipe units as the pressure retaining vessel.

For a subsea environment for process equipment, it is important that both size and weight are minimized due to handling, especially in bad weather or rough seas. A compact design maximizing on the capacity of process equipment is therefore of prime importance.

Figure 29:
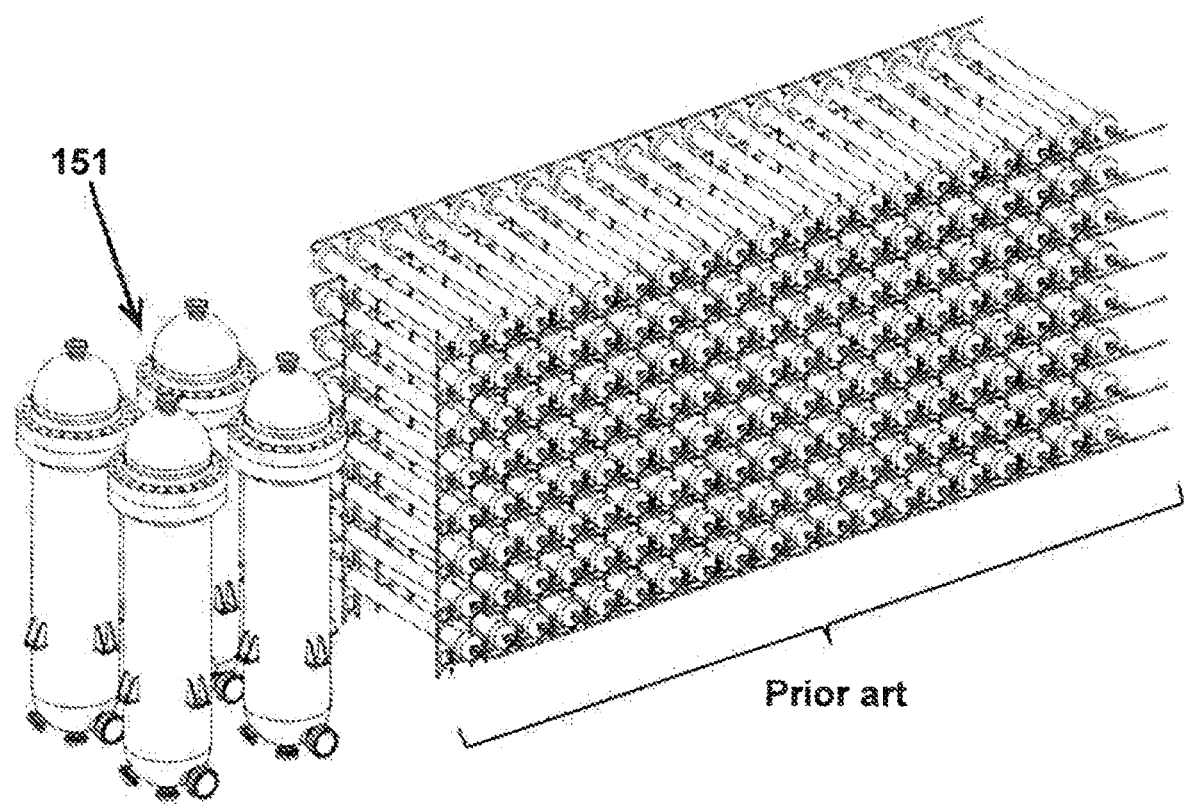
FIG. 29 shows a perspective view comparing an embodiment of the present invention to an example of the prior art.

As an illustration of some of the advantages of the present invention compared to other methods of packaging membrane filters, FIG. 29 illustrates a typical conventional array of membrane filter in individual vessels interconnected by external piping. A total of 160 membrane filter vessels here occupy a large area of approximately 8×15 meters in plan and 8 meters in height, whereas four multi-membrane vessels according to the present invention, having a similar number of membrane filter units, occupies only a plan area of 6×8 meters, and 8 meters in height. The total weight of the conventional vessel membrane filters is approximately 150 tons, whereas the total weight of the four multi-membrane vessels according to the present invention is approximately 80 tons (20 tons each).

Figure 30:
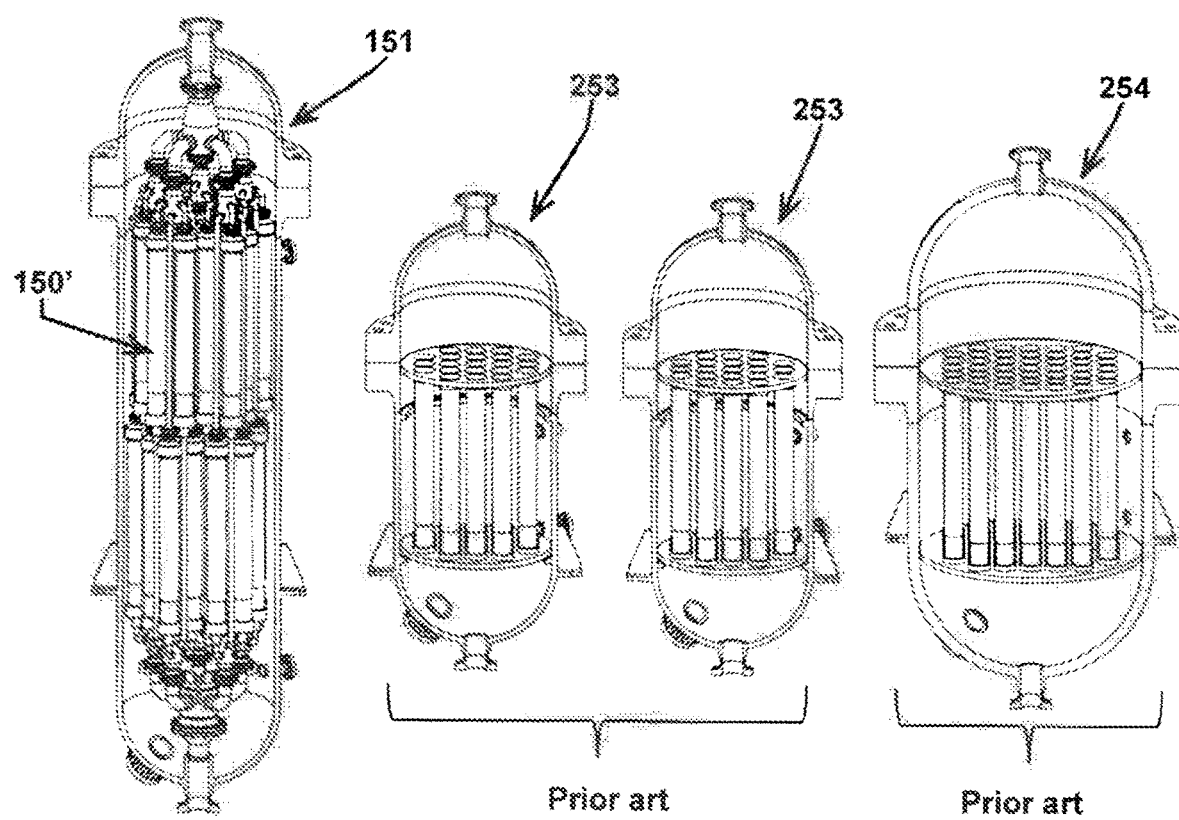
FIG. 30 shows a perspective view comparing an embodiment of the present invention to an example of the prior art.

FIG. 30 shows yet another comparison between the present invention and the prior art. Two prior art membrane filter pressure vessels 253 are required to accommodate the same number of membrane filter units as the augmented unitary membrane filter cartridge 150' according to the present invention. To equal the same number of membrane filter units as in the augmented unitary membrane filter cartridge 150' according to the present invention, two of the prior are filter pressure vessels 253 are needed or, alternatively, a larger prior art vessel 254 containing the same number of membrane filter units can be used. However, these alternatives have major consequences. Firstly, there is the weight difference as on single multi membrane vessel with two levels of filters as described by the present invention weight is 20 tons, whereas the single membrane level vessel weight is 14 tons, but two are needed therefor weighing 28 tons. The larger prior art vessel 254 (having the same number of membrane filter units) has a total weight of 37 tons. These weights are examples, and are for each case calculated by industry standard pressure vessel design for a subsea installation (internal pressure: 100 bar, water depth: 300 meters).

The following remarks apply to all of the embodiments described above:

Although the present invention has been described in relation to the use of membrane filter separation of hydrocarbons in a subsea environment, it should be understood that the present invention is equally applicable to any other conventional applications normally referred to as ultrafiltration membrane technology processes, such as, but not necessarily limited to, air separation, nitrogen generation, carbon dioxide removal, hydrogen purification, fuel filtering, water cleansing, sulphates.

Although flanges have been described as a suitable connection, it should be understand that other connections may be equally applicable, for example, threaded connections, press-fitted connections, glued connections, or similar.

Although the present invention has been described and illustrated with certain numbers of membrane filter units and membrane filter cartridges, the present invention shall not be limited to the numbers illustrated. However, a unitary membrane filter cartridge comprises a plurality (two or more) membrane filter units. The invented cartridge-type filter assembly may be a part of a stand-alone process unit or be an integral part of any other process equipment subsea, topsides or on land. It may be a pre-process unit or a post-process unit for other process equipment. Reference should also be had to the appended claims.

LIST OF REFERENCE NUMERALS

60 Membrane filter
61 End pipe fitting
62 End cup
63 Flange
64 O-ring seal
65 O-ring
100 First manifold
101 Second manifold
102 First conduit (of second set of conduits)
103 First conduit (of first set of conduits)
104 Second conduit (of second set of conduits)
105 Second conduit (of first set of conduits)
106 Socket
107 Flange/Flanged termination
108 Membrane filter unit
109 Connecting bar
110 Connection member
111 Inlet conduit
112 Outlet conduit
120, 120' Unitary membrane filter cartridge
121 Second augmented manifold
122 First augmented manifold
123 Centering guide
124 O-ring seal
125 Cartridge top flange
150, 150' Augmented unitary membrane filter cartridge
151 Pressure vessel
151a Pressure vessel first section
151b Pressure vessel second section
153 Nozzle
154 Stab nozzle
158 Lateral outflow (retentate) port
159 Lateral inflow (unfiltered process flow) port
160 Permeate outlet
161a Releasable flange
161b Releasable flange
200 First transport pipe
201 Second transport pipe
202 First manifold/Header
203 Second manifold/Header
204 Flange
210 Unitary membrane filter cartridge
220 Augmented unitary membrane filter cartridge/Cartridge string
221a Termination pipe
221b Termination pipe
230 Pipe
231 Pressure vessel
253 Filter pressure vessel
254 Larger prior art vessel
F Inflow end
$F_a$ Unfiltered flow into the membrane filter
$F_b$ Unfiltered flow
$L_1$ Lower level
$L_2$ Upper level
P Permeate
$P_a$ Permeate flow
$P_b$ Permeate
R Retentate end
$R_a$ Retentate
$R_b$ Retentate (not passing through the membrane)
$x_1$ Longitudinal axis

What is claimed is:

1. A filter device comprising:
a common inlet manifold;
a common outlet manifold; and
at least two membrane filter units which are configured to be elongated, each of the at least two membrane filter units comprising:
an inlet opening for a fluid flow to be processed,
a first outlet opening for at least a retentate portion of the fluid flow, and
a second outlet opening for at least a remaining portion of the fluid flow,
wherein,
each inlet opening of each of the at least two membrane filter units is fluidly connected to the common inlet manifold, and each first outlet opening of each of the at least two membrane filter units is fluidly connected to the common outlet manifold, wherein, at least one of the at least two membrane filter units is arranged at a first position along a longitudinal axis, at least another one of the at least two membrane filter units is arranged at a second position along the longitudinal axis, the two membrane filter units being staggered with respect to each other and not being axially aligned with respect to each other, and the at least one of the at least two membrane filter units is fluidly connected to the common inlet manifold and to the common outlet manifold via a first set of conduits, and the at least another one of the at least two membrane filter unit is fluidly connected to the common inlet manifold and to the common outlet manifold via a second set of conduits.

2. The filter device as recited in claim 1, wherein, the first set of conduits comprises a first conduit and a second conduit, the first conduit being longer than the second conduit, the second set of conduits comprises a first conduit and a second conduit, the first conduit being shorter than the second conduit, and a total length of a flowpath of the first conduit and the second conduit of the first set of conduits, and a total length of a flowpath of the first conduit and the second conduit of the second set of conduits, is the same.

3. The filter device as recited in claim 1, further comprising:

a structural connection device, wherein, the common inlet manifold and the common outlet manifold are structurally interconnected via the structural connection device so as to form a unitary membrane filter cartridge.

4. The filter device as recited in claim 3, wherein the structural connection device comprises an interlocking member which is configured to provide a structural integrity and to lock together the at least two membrane filter units, the common inlet manifold, and the common outlet manifold.

5. The filter device as recited in claim 4, wherein the interlocking member is connected to the common inlet manifold and to the common outlet manifold.

6. The filter device as recited in claim 3, further comprising:

a plurality of the unitary membrane filter cartridges;

an augmented inlet manifold; and an augmented outlet manifold, wherein, the common inlet manifold of each of the plurality of the unitary membrane filter cartridges is connected to the augmented inlet manifold, and the common outlet manifold of each of the plurality of the unitary membrane filter cartridges is connected to the augmented outlet manifold, so as to form an augmented unitary membrane filter cartridge.

7. The filter device as recited in claim 6, further comprising:

a first pressure vessel part, wherein, the augmented unitary membrane filter cartridge comprises a connection which is configures so that augmented unitary membrane filter cartridge is connectable to and supportable by the first pressure vessel part as one single unit.

8. The filter device as recited in claim 6, wherein the unitary membrane filter cartridge and the augmented unitary membrane filter cartridge each form unitary, elongated, bodies around a common longitudinal axis.

9. The filter device as recited in claim 6, wherein the unitary membrane filter cartridge and the augmented unitary membrane filter cartridge each are configured to be inserted into a pressure-retaining device having a circular cross-section.

10. The filter device as recited in claim 9, wherein the pressure-retaining device is a pressure vessel or a pipe.

11. The filter device as recited in claim 3, further comprising:

a plurality of the unitary membrane filter cartridges;

wherein, the plurality of the unitary membrane filter cartridges are fluidly and structurally interconnected in an end-to-end relationship so as to form a cartridge string.

12. A membrane filter unit comprising, the filter device as recited in claim 1; and a pressure vessel comprising an inlet port, an outlet port, and an opening through which a filtered fluid is passable, wherein, the filter device is arranged in the pressure vessel, and the filter device is fluidly connected to the inlet port and to the outlet port of the pressure vessel.

13. A method of using the filter device as recited in claim 6 at a subsea location, the method comprising:

arranging at least one unitary membrane filter cartridge or at least one augmented unitary membrane filter cartridge as recited in claim 6 in a pipe or in a pressure vessel at the subsea location;

flowing a hydrocarbon fluid into an inlet opening of the filter device; and flowing the retentate out of an outlet opening of the filter device.

14. The method of using as recited in claim 13, further comprising:

arranging the filter device on the seabed location in a substantially vertical upright orientation or in a substantially horizontal orientation.

15. A method of installing a plurality of membrane filter units into a pressure vessel, the method comprising:

forming at least one unitary membrane filter cartridge or at least one augmented unitary membrane filter cartridge as recited in claim 6; and inserting the at least one unitary membrane filter cartridge or the at least one augmented unitary membrane filter cartridge into the pressure vessel as one integral unit.

16. The method as recited in claim 15, wherein, prior to the inserting, the method further comprises:

connecting the at least one unitary membrane filter cartridge to a first pressure vessel part, wherein, the at least one unitary membrane filter cartridge and the first pressure vessel part are configured to be handleable as a unit.

* * * * *